United States Patent
Kniberg et al.

(10) Patent No.: US 8,360,855 B2
(45) Date of Patent: Jan. 29, 2013

(54) METHOD OF CONTROLLING AN UPDATE OF GAME CODE IN A GAMING SYSTEM

(75) Inventors: Henrik Kniberg, Ska (SE); Jens Gustav Nilsson, Saltsjo-Boo (SE); Peter Vincent, Hagersten (SE); Ulf Abrink, Balsta (SE); Sven Hakan Andersson, Sundbyberg (SE)

(73) Assignee: ACEI AB (SE)

( * ) Notice: Subject to any disclaimer, the term of this patent is extended or adjusted under 35 U.S.C. 154(b) by 746 days.

(21) Appl. No.: 12/140,863

(22) Filed: Jun. 17, 2008

(65) Prior Publication Data

US 2009/0075736 A1 Mar. 19, 2009

(30) Foreign Application Priority Data

Jun. 19, 2007 (AU) ................................ 2007903288

(51) Int. Cl.
*A63F 9/24* (2006.01)
(52) U.S. Cl. .......................................... 463/24; 463/29
(58) Field of Classification Search .................... 463/24, 463/25, 29
See application file for complete search history.

(56) References Cited

U.S. PATENT DOCUMENTS

| | | | |
|---|---|---|---|
| 2003/0101245 A1* | 5/2003 | Srinivasan et al. ............ 709/221 |
| 2003/0143991 A1 | 7/2003 | Minear et al. | |
| 2004/0128250 A1* | 7/2004 | Fox et al. ......................... 705/52 |
| 2004/0139175 A1* | 7/2004 | Lin ................. 709/220 |
| 2005/0026692 A1* | 2/2005 | Dyl ................................. 463/42 |
| 2005/0054448 A1* | 3/2005 | Frerking et al. ................ 463/42 |
| 2005/0192099 A1* | 9/2005 | Nguyen et al. ................. 463/42 |
| 2006/0035713 A1* | 2/2006 | Cockerille et al. ............. 463/42 |
| 2009/0181775 A1* | 7/2009 | Nilsson et al. ................. 463/42 |
| 2010/0087255 A1* | 4/2010 | Kniberg et al. ................ 463/42 |

FOREIGN PATENT DOCUMENTS

WO 02/064228 A2 8/2002

* cited by examiner

*Primary Examiner* — Corbett B Coburn
(74) *Attorney, Agent, or Firm* — McAndrews, Held & Malloy, Ltd.

(57) ABSTRACT

Methods of controlling migration to new version game code during an active game session are disclosed. In an embodiment, new version game code is received at a game server. In response to receipt of a game request from a gaining client at a gaming server, the current version code an active game session is employing is determined. The active gaming session is migrated to the new version code if the new version code is compatible. The migration to be performed is controlled by a reconnect if the new version code contains a new sub-component related to the client. Also, related gaming servers, gaining systems, methods of controlling game code updates in gaming systems, and game version distribution controllers are disclosed.

18 Claims, 4 Drawing Sheets

METHOD OF CONTROLLING AN UPDATE OF GAME CODE IN A GAMING SYSTEM

RELATED APPLICATIONS

This application claims priority to Australian Provisional Patent Application No. 2007903288, having an international filing date of Jun. 19, 2007, entitled "A Method of Controlling an Update Of Game Code In A Gaming System," which is hereby incorporated by reference herein in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a method of controlling an update of game code in a gaming system, a gaming system, a game version distribution controller for a gaming system, a method of controlling migration to new version game code during an active game session, and a gaming server.

BACKGROUND OF THE INVENTION

Recently, there has been a move toward server based gaming. An advantage of server based gaming is that the game content on a gaming machine can be varied. Accordingly, an operator can provide choices of games to be played on a gaming machine or change the available gaming content more regularly. In such an environment, games may need to be updated while game sessions are in progress. Accordingly, there is a need to ensure that such update processes are handled effectively.

SUMMARY OF THE INVENTION

In a first aspect the invention provides a method of controlling migration to new version game code during an active game session comprising:
 receiving new version game code at a game server;
 determining the current version code an active game session is employing in response to receipt of a game request from a gaming client at a gaming server;
 migrating the active gaming session to the new version code if the new version code is compatible; and
 controlling the migration to be performed by a reconnect if the new version code contains a new sub-component related to the client.

In an embodiment, the new sub-component comprises a new client package.

In an embodiment, the new sub-component comprises a new configuration file.

In an embodiment, the new sub-component comprises either or both of a new client package and a new configuration file.

In an embodiment, the method comprises terminating the gaming session if the new version code is incompatible with the determined current version code.

In an embodiment, the method comprises controlling the migration by continuing the game session if there is no new sub-component related to the client.

In a second aspect the invention provides a gaming server adapted to:
 receive new version game code;
 determine the current version code an active game session is employing in response to receipt of a game request from a gaming client in relation to the game session;
 migrate the active game session to the new version code if the new version code is compatible; and
 control the migration to be performed by a reconnect by the gaming client if the new version code contains a new sub-component related to the gaming client.

In an embodiment, the new sub-component comprises a new client package.

In an embodiment, the new sub-component comprises a new configuration file.

In an embodiment, the new sub-component comprises either or both of a new client package and a new configuration file.

In an embodiment, the gaming server is arranged to terminate the gaming session if the new version code is incompatible with the determined current version code.

In an embodiment, the gaming server is arranged to control the migration by continuing the game session if there is no new sub-component related to the client.

In a third aspect the invention provides a gaming system comprising:
 a gaming client; and
 a gaming server adapted to:
 receive new version game code;
 determine the current version code a game session is employing in response to receipt of a game request from a gaming client in relation to the game session;
 migrate the game session to the new version code if the new version code is compatible; and
 control the migration to be performed by a reconnect by the client if the new version code contains a new sub-component related to the gaming client.

In an embodiment, the new sub-component comprises a new client package.

In an embodiment, the new sub-component comprises a new configuration file.

In an embodiment, the new sub-component comprises either or both of a new client package and a new configuration file.

In an embodiment, the gaming server is arranged to terminate the gaming session if the new version code is incompatible with the determined current version code.

In an embodiment, the gaming server is arranged to control the migration by continuing the game session if there is no new sub-component related to the client.

In a fourth aspect the invention provides a method of controlling an update of game code in a gaming system comprising:
 distributing new version game code intended to replace current version code to a set of affected gaming servers, each gaming server arranged such that it may be conducting a game session with at least one gaming client during which portions of the current version game code are executed by the gaming server and the gaming client respectively when the new version code is distributed;
 permitting continued execution of the current version game code during the distribution step; and
 controlling the gaming system subsequent to completion of distribution of the new version game code to prevent further execution of the current version code in a game session.

In an embodiment, the new version code contains a new portion of code relevant to at least one of the gaming server and the gaming client.

In an embodiment, the new version code contains new portions of code relevant to both the gaming server and the gaming client.

In an embodiment, controlling the gaming system comprises stopping all active gaming sessions between gaming clients and gaming servers.

In an embodiment, the method comprises:
saving gaming parameters of each stopped gaming session if it is determined that the new version game code is compatible with the current version game code; and
restarting the gaming session with the saved gaming parameters and the new version game code.

In an embodiment, the method comprises:
ending the gaming session if it is determined that the new version game code is incompatible with the current version game code; and
refunding any current player stake to the player.

In an embodiment, the method comprises terminating the game session of each stopped game and issuing a reconnect voucher to the player.

In a fifth aspect the invention provides a gaming system comprising:
at least one gaming server;
a game version distribution controller arranged to:
distribute new version game code intended to replace current version code to a set of affected gaming servers, each gaming server arranged such that it may be conducting a game session with at least one gaming client during which portions of the current version game code are executed by the gaming server and the gaming client respectively when the new version code is distributed;
permit continued execution of the current version game code during the distribution step; and
control the gaming system subsequent to completion of distribution of the new version game code to prevent further execution of the current version code in a game session.

In an embodiment, the new version code contains a new portion of code relevant to at least one of the gaming server and the gaming client.

In an embodiment, the new version code contains new portions of code relevant to both the gaming server and the gaming client.

In an embodiment, the game version distribution controller controls the gaming system by stopping all active gaming sessions between gaming clients and gaming servers.

In an embodiment, each game server is arranged to:
save gaming parameters of each stopped gaming session if it is determined that the new version game code is compatible with the current version game code; and
restart the gaming session with the saved gaming parameters and the new version game code.

In an embodiment, each game server is arranged to:
end the gaming session if it is determined that the new version game code is incompatible with the current version game code; and
refund any current player stake to the player.

In an embodiment, each game server is arranged to terminate the game session of each stopped game and issuing a reconnect voucher to the player.

In an embodiment, the game version distribution controller is operable to specify whether the new version game code is compatible with the current version game code.

In a sixth aspect the invention provides a game version distribution controller for a gaming system arranged to:
distribute new version game code intended to replace current version code to a set of affected gaming servers, each gaming server arranged such that it may be conducting a game session with at least one gaming client during which portions of the current version game code are executed by the gaming server and the gaming client respectively when the new version code is distributed;
permit continued execution of the current version game code during the distribution step; and
control the gaming system subsequent to completion of distribution of the new version game code to prevent further execution of the current version code in a game session.

In an embodiment, the new version code contains a new portion of code relevant to at least one of the gaming server and the gaming client.

In an embodiment, the new version code contains new portions of code relevant to both the gaming server and the gaming client.

In an embodiment, the game version distribution controller is arranged to control the gaming system by stopping all active gaming sessions between gaming clients and gaming servers.

In an embodiment, the game version distribution controller is operable to specify whether the new version game code is compatible with the current version game code.

BRIEF DESCRIPTION OF SEVERAL VIEWS OF THE DRAWINGS

The invention is further explained by means of the following non-limiting examples and in conjunction with the accompanying drawings, in which.

DETAILED DESCRIPTION OF THE INVENTION

In the embodiment the described method steps and functions are realized by computer system components, computer software code portions, or by combinations thereof. It is within the knowledge of the skilled person to select appropriate components for the realization of the invention.

The embodiment provides techniques for controlling software updates in a gaming system.

Figure 1:
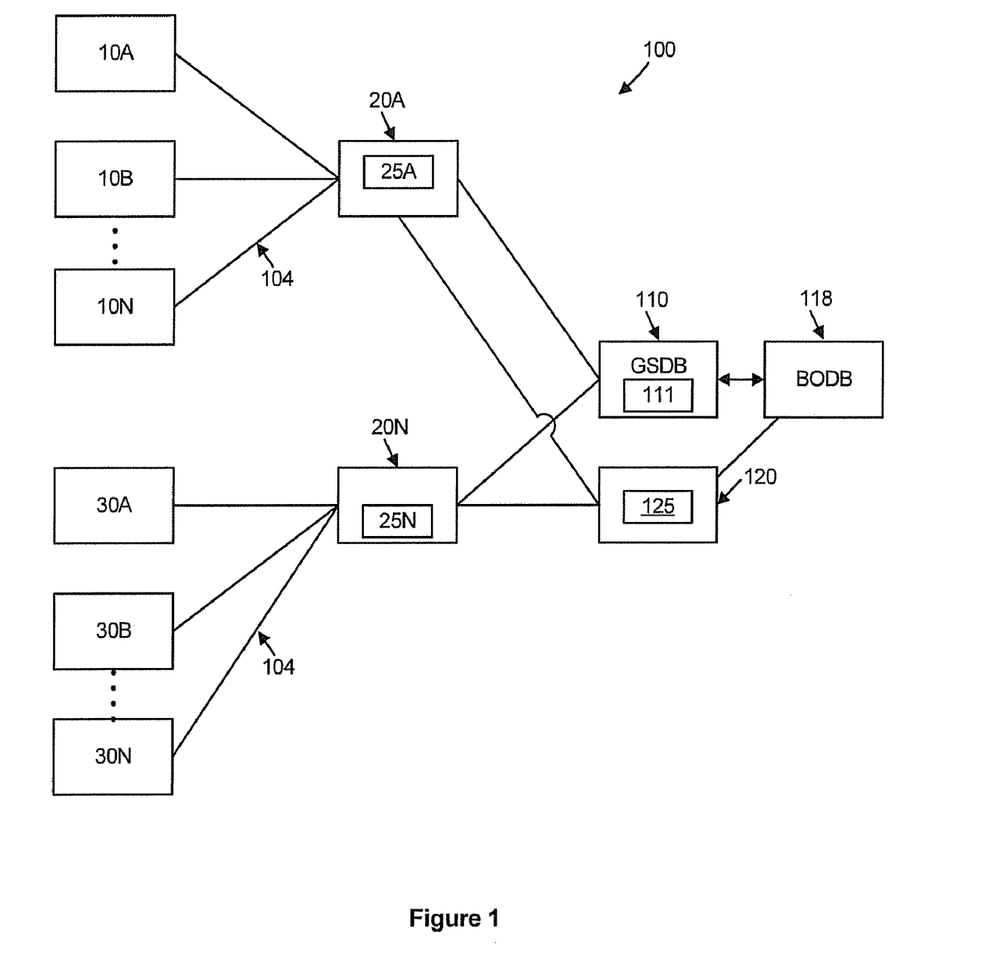
FIG. 1 shows schematically a client server architecture.

FIG. 1 shows schematically an exemplifying embodiment of a client/server based gaming system 100. A plurality of gaming machines (also known as gaming terminals or gaming clients), here illustrated with a first group of gaming machines 10 including a first client gaming machine 10A and a second gaming machine 10B and nth gaming machine 10N (where n is an arbitrary integer), are communicatively coupled to a first game application server 20A via a communications network 104. The first game application server 20A is in turn communicatively coupled to a game server database (GSDB) 110. Any number of groups of gaming machines eg. a second group 30 may be coupled by further gaming servers 20 to the GSDB 110. The game server database 110 is farther communicatively coupled to a back office database (BODB) 118. The game application server 106 has a game storage structure 25 and a game server database has a game storage structure 111.

A game version distribution controller 120 is communicatively coupled to the BODB 118 and the game server 25. The game version distribution controller 120 has a user interface 125 operable by a user to control a software update. "Communicatively coupled" in this specification means that there is provided a communication link over which information signals can be communicated between two coupled units, for example in the form data packets or the like. The communication link can for example be continuously activated in an on-line state or be activated on request when a message, e.g. in the shape of a request or a response, is communicated.

Figure 2:
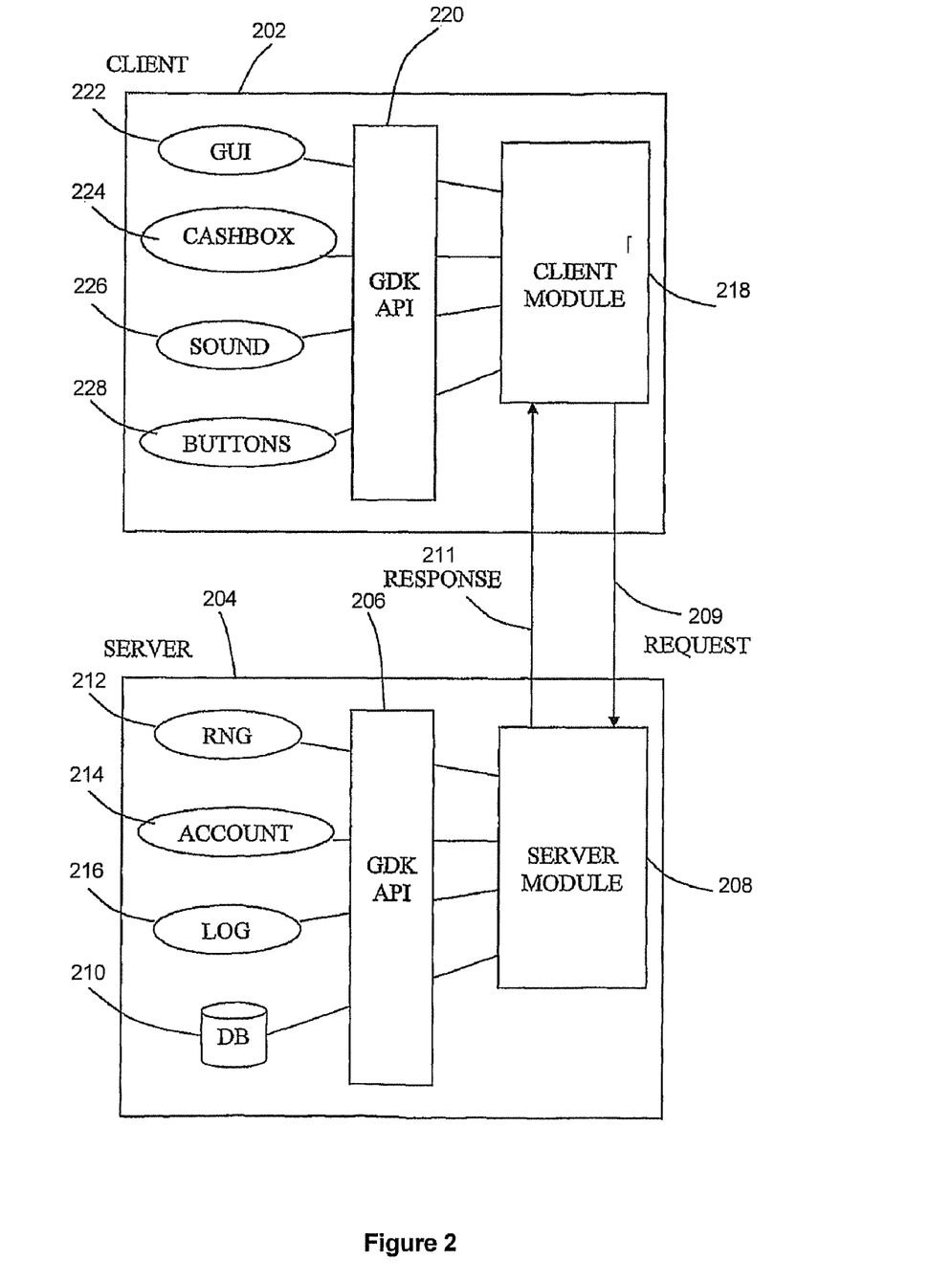
FIG. 2 shows a block diagram of further components of a gaming system.

The gaming system according to the present embodiment is based on a client/server architecture where the game software is divided into a client game module 218 and a server game module 208 with access to a central database 110. In order to run a game the client game module 218 must be associated with and use functions available at a server game module 208. When a game is played via a client gaming machine, a game session is established and game session data is generated in the course of the game. Each game session has a specific identity and is assigned a game session identify code. The game session data is stored in the game server database associated with the game session identity code.

FIG. 2 shows schematically a client and server based computerised gaming system with a client gaming machine terminal 202 and a gaming server 204 that are communicatively coupled. A person skilled in the art will appreciate that the gaming machine 202 and the gaming server 204 are provided with data processors, memory, data communications interfaces, control programs, user input/output interfaces etc. Different functions and features that are specific for the embodiment are preferably realised by software computer program code executed by data processors in the server and in the client respectively, or by employing specifically designed electronic components, or by combinations of software and electronic components. In the example of FIG. 2 there is only a single client gaming machine 202 but of course a number of client gaming machines can be and are normally connected to a server 204. In this context a server 204 generally means hardware and software units in a central system that provide server functions, database functions and other centralized functions to connectable client gaming machines.

The server 204 is provided with a game application program interface, in short called server game API 206, enabling communication between a server module of a specific game application program 208 and general server gaming functions 210,212,214,216 installed on the server. The general server gaming functions are provided to be available for any specific game application program independently of the specific game content. These general server gaming functions are typically functions such as a database 210, a random number generator 212, an account service function 214, a log service function 216, or other functions that can be beneficially shared and used by different specific game application programs.

The client gaming machine 202 is also provided with a game application program interface, in short called client game API 220, enabling communication between a client game module 218 of the specific game application program and general client gaming functions 222,224,226,228 installed on the client gaming machine 202 and used by different client game modules. The general client gaming functions are designed for assisting in implementing and executing a specific game on the client gaming machine 202 and are available for the client game module 218. These general client gaming functions are in different embodiments a selection of a graphical user interface (GUI) 222, a cashbox function 224, a sound function 226, user input interface function, for example buttons, 228, data storage 229, a printer 203, a bar code reader 233 and other functions that are related to the performance of a game. The client game module 218 is communicatively coupled to the corresponding server game module 208 for communicating requests 209 and responses 211 in order to utilize the general gaming functions provided in the server. For each game a message protocol for communication between the client module and the server module is generated, the protocol is for example based on XML and is shared by the client and the server.

A specific game application program thus has a server game module 208 and a client game module 218 that communicate either directly or via an application program interface on the client side and the server side respectively as shown in FIG. 2. The client game module 218 uses a selection of general client gaming functions that are available in the client gaming machine, whereas the server module 208 uses a selection of general server gaming functions 210,212,214,216 that are commonly used by different game applications and that are provided and available centrally in the server 204. Further details of a server gaming architecture can be found in WO 2006/052213 and PCT/SE2006/000559, the disclosures of which are incorporated herein by reference.

Establishment of the gaming session involves the gaming server loading the relevant server module, and providing (if necessary) the relevant client module to the client gaming machine.

In an embodiment, there is provided an update technique having a first deployment phase in which new version code is distributed to a set of affected gaming servers and a migration phase wherein migration to the new version game code occurs. Each version of game code has a number of components, namely a game configuration file stored in the game server database (GSDB) 110, a server game component installed on the game server 20 and a client game component stored in the gaming machine client 10.

In addition, other components may form part of the gaming code, for example, information code for an information terminal. However, for present purposes the embodiment is restricted to those components which can affect a game session. In the embodiment in order to store and update a game, the method involves:

Loading a game parameter configuration file in the GSDB 110 in configuration file storage area 111, by operating the user interface 125 of the game version controller 120.

Installing the new updated components on the gaming server 20.

Installing the new updated game components on affected gaming clients 10 and activating the new game variant once this has been completed. Persons skilled in the art will appreciate that depending on the update, one of, two of or all of the configuration file, the gaming server component and the client component may be modified.

In this manner it is ensured that in this embodiment, all game sessions between gaming servers and gaming machines use the same game version.

In an embodiment described in relation to FIG. 3 and FIG. 4 below, the new game variant may be activated prior to installation of the new updated game components on the gaming machine clients 10 provided sub-components relevant to the gaming machine are compatible with the old version. In this embodiment, the relevant sub-components are the gaming client component and the configuration file.

Figure 3:
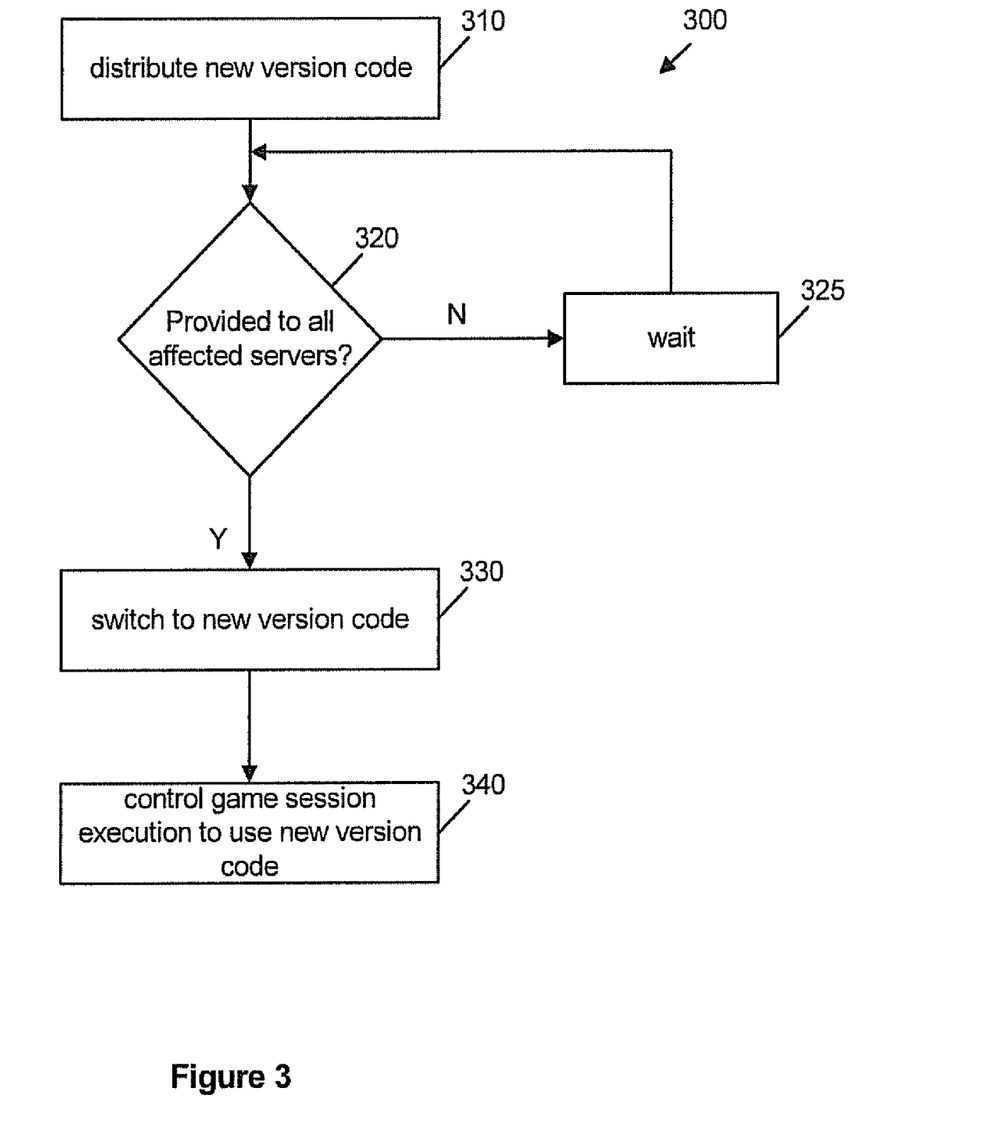
FIG. 3 is a flow chart of an update control method.
Figure 4:
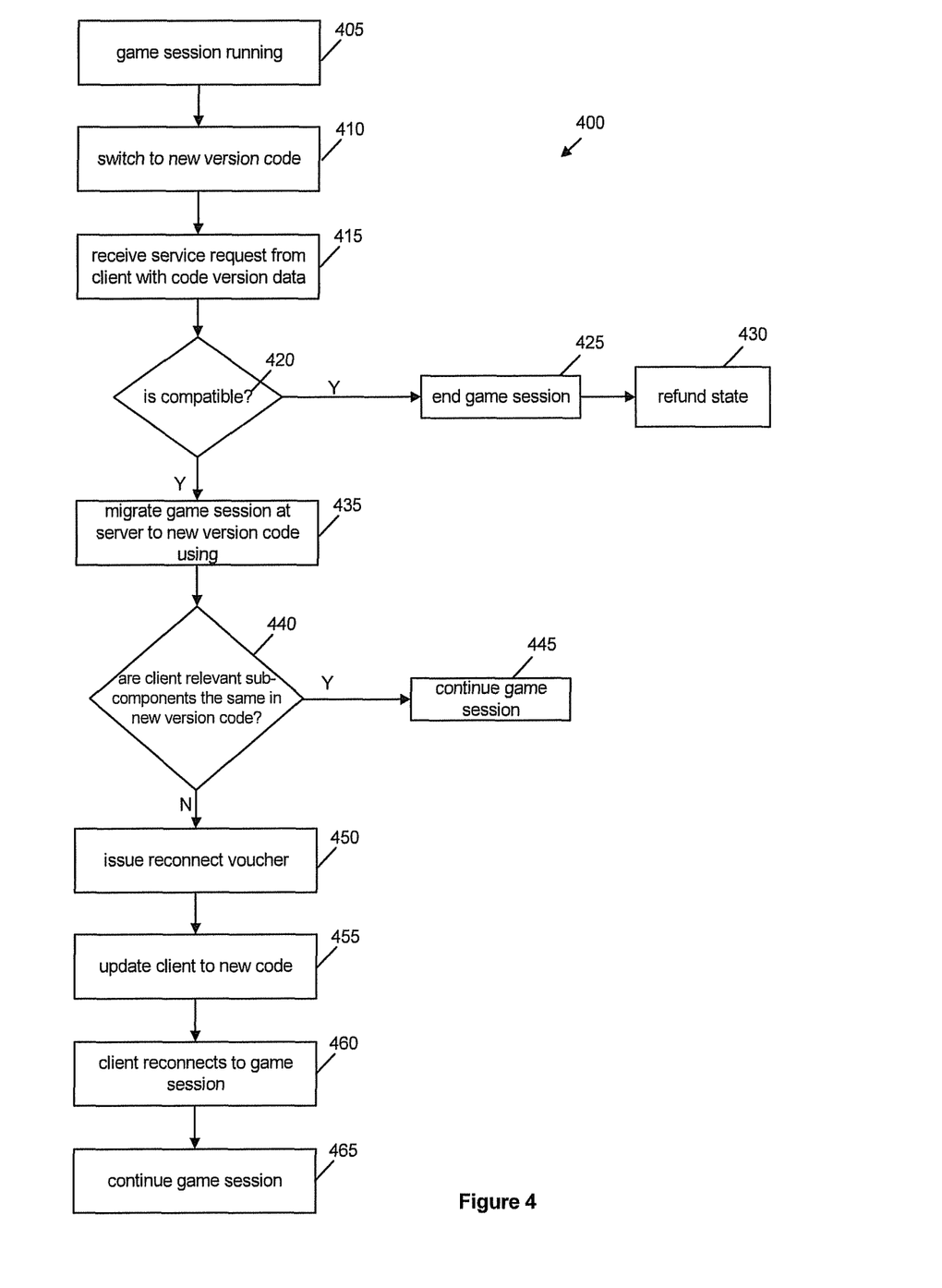
FIG. 4 is a flow chart of a further part of an update control method.

Accordingly referring to FIG. 3, the method of this embodiment involves distributing new version code 310, determining 320 whether the new version code has been provided to all affected servers and entering a wait state 325 at the game version controller 120 until it has been confirmed that all affected servers have received the new game code. Switching to the new version code 330 and controlling the game session execution to use the new version code 340. The control of step 340 can be achieved in a number of ways, however, in the embodiment it is done in respect of active game sessions as illustrated in FIG. 4. Where there is no active game session, the client can be updated without this migration process. Accordingly, as shown in FIG. 4, the method assumes the game session is running 405 (i.e. active). The server is switched 410 to the new version code after the code has been distributed to all the affected servers. The server receives a service request 415 from the client gaming machine to carry out a server function in relation to the game. The service request includes code version data that enables the server to determine what code version is currently being employed by the client gaming machine 10. The distribution of the new game package defines what is the oldest compatible version of the game code. Accordingly, the game server determines whether the current version is compatible with the new version game code at step 420. If the server version is incompatible at step 420 or any of the client versions are incompatible the game session is ended at step 425 and a refund of the stake 430 is made to the player of the gaming machine client 10.

The next stage in the method is to migrate the game session 435 at the game server to the new version code using the current game parameters. Then, it is determined 440 whether the client relevant sub-components (in this embodiment the configuration package component and the client component) are the same in the new game version code. If they are the same, the game session continues 445. If they are different, the method involves issuing a reconnect voucher 450 so that the game session can be continued after the client has updated. To achieve this, the client is issued with a reconnect voucher 450 which is printed and provided to the player to allow a player to issue a reconnect code once the update has completed. An update of the client to the new version code is conducted 455. The player provides the reconnect voucher to the gaming machine terminal 10 and the client reconnects to the game session 460. The game session then continues 465.

Accordingly, there are four variations:
1. The client is using the same game version—i.e. the client has already been updated;
2. There are compatible versions and the game can continue;
3. There are compatible versions but reconnect is required; and
4. The versions are incompatible and the game session must be ended.

A person skilled in the art will appreciate that once there is a reconnect, it is established whether the reconnect is for the current game version before continuing the game session.

A person skilled in the art will also appreciate that in some instances, different games may share the same client file packages, server file packages or both. Accordingly, new version code may be distributed that affects more than one game.

Various other modifications will be apparent to person skilled in the art. In particular features of the above embodiments and examples can be employed to form further embodiments.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of controlling migration to new version game code during an active game session comprising:
   receiving a new version game code at a game server;
   determining at the game server a current version code, an active game session is employing at a gaming client, in response to receipt of a game request from the gaming client at the game server;
   ending the active game session and refunding a stake of the gaming client if it is determined that the current version code the active game session is employing at the gaming client is incompatible with the new version game code received at the game server;
   migrating the active game session at the game server to the new version code received at the game server if the new version code is compatible with the current version code the active game session is employing at the gaming client; and
   determining if the new version code received at the game server contains a new sub-component related to the gaming client;
   controlling the migration to be performed by issuing a reconnect voucher in response to determining that the new version code at the game server contains a new sub-component related to the gaming client, such that the active game session can be reconnected and continued once an update of the gaming client to the new version game code has been completed; and
   continuing the active game session in response to determining that the new version code at the game server does not contain a new sub-component related to the gaming client.

2. A method as claimed in claim 1, wherein the new sub-component comprises a new client package.

3. A method as claimed in claim 1, wherein the new sub-component comprises a new configuration file.

4. A method as claimed in claim 1, wherein the new sub-component comprises either or both of a new client package and a new configuration file.

5. A method as claimed in claim 1, comprising terminating the game session if the new version code is incompatible with the determined current version code.

6. A method as claimed in claim 1, comprising controlling the migration by continuing the active game session if there is no new sub-component related to the client.

7. A gaming server adapted to:
   receive a new version game code;
   determine a current version code, an active game session is employing at a gaming client, in response to receipt of a game request from the gaming client in relation to the active game session;
   end the active game session and refund a stake at the gaming client if it is determined that the current version code the active game session is employing at the gaming client is incompatible with the new version game code received at the game server;
   migrate the active game session to the new version code received at the game server if the new version code is compatible with the current version code the active game session is employing at the gaming client;
   determine by the gaming client if the new version code received at the game server contains a new sub-component related to the gaming client;

control the migration to be performed by issuing a reconnect voucher in response to determining that the new version code at the game server contains a new sub-component related to the gaming client, such that the active game session can be reconnected and continued once an update of the gaming client to the new version game code has been completed; and continue the active game session in response to determining that the new version code at the game server does not contain a new sub-component related to the gaming client.

8. A gaming server as claimed in claim 7, wherein the new sub-component comprises a new client package.

9. A gaming server as claimed in claim 7, wherein the new sub-component comprises a new configuration file.

10. A gaming server as claimed in claim 7, wherein the new sub-component comprises either or both of a new client package and a new configuration file.

11. A gaming server as claimed in claim 7, wherein the gaming server is arranged to terminate the active game session if the new version code is incompatible with the determined current version code.

12. A gaming server as claimed in claim 7, wherein the gaming server is arranged to control the migration by continuing the active game session if there is no new sub-component related to the client.

13. A gaming system comprising:
a gaming client; and
a gaming server adapted to:
  receive a new version game code;
  determine a current version code, a game session is employing at a gaming client, in response to receipt of a game request from the gaming client in relation to the game session;
  end the active game session and refund a stake at the gaming client if it is determined that the current version code the active game session is employing at the gaming client is incompatible with the new version game code received at the game server;
  migrate the game session to the new version code received at the game server if the new version code is compatible with the current version code the active gaming session is employing at the gaming client;
  determine by the client if the new version code received at the game server contains a new sub-component related to the gaming client;
  control the migration to be performed by issuing a reconnect voucher in response to determining that the new version code at the game server contains a new sub-component related to the gaming client, such that the active game session can be reconnected and continued once an update of the gaming client to the new version game code has been completed; and
  continue the active game session in response to determining that the new version code at the game server does not contain a new sub-component related to the gaming client.

14. A gaming system as claimed in claim 13, wherein the new sub-component comprises a new client package.

15. A gaming system as claimed in claim 13, wherein the new sub-component comprises a new configuration file.

16. A gaming system as claimed in claim 13, wherein the new sub-component comprises either or both of a new client package and a new configuration file.

17. A gaming system as claimed in claim 13, wherein the gaming server is arranged to terminate the game session if the new version code is incompatible with the determined current version code.

18. A gaming system as claimed in claim 13, wherein the gaming server is arranged to control the migration by continuing the game session if there is no new sub-component related to the client.

* * * * *

UNITED STATES PATENT AND TRADEMARK OFFICE
CERTIFICATE OF CORRECTION

| | | |
|---|---|---|
| PATENT NO. | : 8,360,855 B2 | Page 1 of 1 |
| APPLICATION NO. | : 12/140863 | |
| DATED | : January 29, 2013 | |
| INVENTOR(S) | : Kniberg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this
Eleventh Day of November, 2014

Michelle K. Lee
*Deputy Director of the United States Patent and Trademark Office*